April 14, 1959 P. A. JOYNER ET AL 2,882,414
RADIATION DOSIMETER ELEMENT COATING
Filed Oct. 28, 1953

INVENTORS
POWELL A. JOYNER
JEAN P. PRESSAU
BY
Brown, Critchlow, Flick & Peckham
ATTORNEYS

United States Patent Office 2,882,414
Patented Apr. 14, 1959

2,882,414
RADIATION DOSIMETER ELEMENT COATING

Powell A. Joyner, Butler, and Jean P. Pressau, Bairdford, Pa., assignors to Callery Chemical Company, Pittsburgh, Pa., a corporation of Pennsylvania Application October 28, 1953, Serial No. 388,923

5 Claims. (Cl. 250—83)

This invention relates to the coating of reflector elements of various types, especially the sensitive and color standard elements of dosimeters adapted to indicate accumulated, or total, exposure to gamma radiation, and more particularly to the coating of such elements to provide optimum observation conditions.

Dosimeters of the type referred to take the form of a sensitive element that undergoes color change on exposure to gamma rays. The depth of the color becomes progressively greater with progressive exposure to such radiation. This element may take various forms but a common one is an alkali metal halide crystal containing an alkali metal hydride, usually potassium bromide (KBr) containing potassium hydride (KH). Such an element is mounted in a case with at least one color standard element the color of which corresponds to the color the sensitive element will show upon exposure to a predetermined amount of radiation, say 100 roentgens (100 r.). Usually, more than one color standard element is used, for example, two that correspond, respectively, to exposures of 100 r. and 300 r.

Thus these dosimeters are used for monitoring, i.e., to show when the total exposure to gamma rays has reached a certain amount. The sensitive element and the color standard or standards are usually mounted in a case so as to be shielded from other forms of radiation. The color standard elements might be of glass insensitive to gamma rays and of the proper color or colors. However, one form is made from synthetic resin colored appropriately and so mounted in the case with the sensitive element that their colors are observed by reflected light. To this end it is desirable that all of the elements, both sensitive and color standard, be coated on their faces and the bottom end with white paint so as to increase the effective light path by causing multiple internal reflections. The criteria for such a paint are that it have high luminous reflectance, low spectral selectivity in the visible region, and a directional luminous reflectance close to unity. Magnesium oxide forms a desirable pigment for use in such coatings. However, the difference between the index of refraction of magnesium oxide and that of the commonly used binders is small, resulting in low hiding power.

An object of the present invention is to provide reflector elements having a coating that supplies the foregoing criteria but which possesses good hiding power and which exhibits large difference between the refractive index of the coating particles and air, and particularly to provide such elements for dosimeters of the type alluded to above.

Another object is to provide a method of supplying such coatings that is simple, easily practiced, inexpensive, rapid, and effectively produces the desired type of coating.

In accordance with this invention the reflector, e.g., dosimeter, element is provided with a tacky film of a binder having substantially the same index of refraction as the element itself, and then magnesia (MgO) or titania ($TiO_2$) pigment is applied to the film. We find that in this way we obtain the high luminous reflectance and other optical properties required for such a coating.

The invention will be readily understood by reference to the attached drawing in which.

Figure 1:
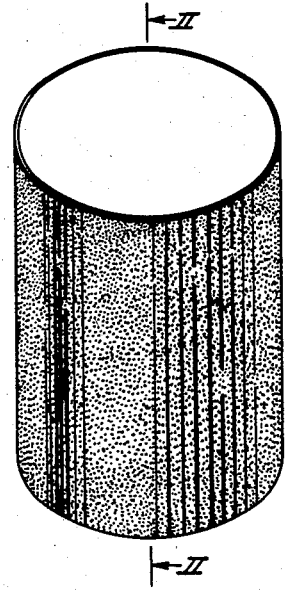
Fig. 1 shows a dosimeter provided with a binder and particle coating as in this invention.
Figure 3:
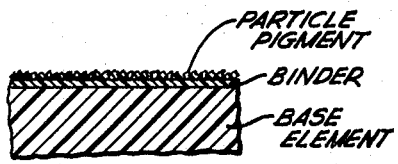
Fig. 3 shows a detailed view of a portion of the dosimeter showing the spatial disposition of the base element, the binder and the particles of pigment.
Figure 2:
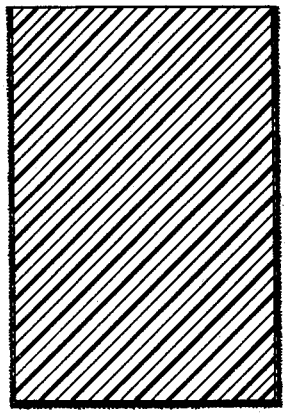
Fig. 2 shows a sectional view of the dosimeter of Fig. 1.

In the preferred practice of the invention as applied to dosimeter color standards the elements are formed from synthetic resin colored to correspond to the color produced in the sensitive element by a predetermined amount of radiation. After the color standards have been made they and the sensitive element are provided with a thin tacky film of the resin of which the color standards are formed and magnesia or titania is then applied to the film, as by spraying or dusting the powder thereon. The film is applied to the four sides and the end of the element that will be at the bottom of the case, leaving the viewing end uncoated.

We have found that the magnesia or titania particles adhere satisfactorily without apparently being wet by the tacky adhesive. We now believe that the adhesion occurs principally at the peaks of the uneven surfaces of the white pigment particles with the remaining portion of the particles not in intimate contact with the binder so that effectively the pigment particles are not wet by the binder. In consequence, the difference between the refractive index of the particles and their surrounding medium (air) is high resulting in good hiding power and providing a coating having the high luminous reflectance desired.

As an example of the practice of the invention, color standards for use with a KBr—KH radiation sensitive element were made from a partially polymerized glycol alkyd copolymer with styrene sold by the Pittsburgh Plate Glass Company, of Pittsburgh, Pennsylvania, as "Selectron 5026" resin. This resin as received has a slight green cast which is compensated for by the addition of a red dye. This dye is added in an amount to produce a transmission of 52.5 percent at a wave length of 515 millimicrons as determined by a Beckman model DU spectrophotometer using a 0.021 mm. slit width and a path of one cm., this may be termed stock solution A. For this purpose there may be used a red dye from the same source of the resin and identified as "Selectron 5546" red pigment. A stock solution B is then made from stock solution A by diluting the resin as received with enough of solution A to render it water white; usually 1 weight part of B per 14.4 parts of resin as received suffices. Stock B solution is then used to make stock C solution by adding to it a blue dye until there is developed a transmission of 53.2 percent at 625 millimicrons as determined in the same way but using a slit width of 0.037 mm. Stock C may then be used for making desired standards. Thus, to make a 300 r. standard, stock C solution is diluted with 0.4 part of stock B, while for a 100 r. standard, one part of stock C is diluted with 3.2 parts of stock B. The resin solutions thus prepared are then treated with an appropriate catalyst, such as 0.5 percent by weight of t-butyl hydroperoxide and shapes of appropriate size and weight are then molded and cured by heating in an oven at about 200° F. for one hour. Most suitably the viewing surface of the standards is formed by molding against a glass plate.

This type of resin is especially desirable for these purposes because it is possible to make molded color standards that are free from bubbles and other defects that would depreciate their optical properties.

When the standards are to be coated they are provided with a film of the resin dissolved in a solvent, such as acetone. The film may be formed in any suitable manner, as by spraying. Magnesium oxide or titania is then applied to the resultant tacky film, suitably by dusting or by spraying the oxide powder suspended in a volatile carrier.

Although the invention has been described with reference to a particular type of resin, it will be understood that it is applicable to other resins by the use of a tacky film having the same index of refraction as the color standards and crystals, most suitably the resin from which the standard elements are made. Thus, satisfactorily clear color standards may be made from methyl methacrylate, in which instance partially polymerized methyl methacrylate would preferably be used for forming the tacky film. Also, other white pigments of high reflectance and good hiding power than those named may be used.

Furthermore, although this method of applying a reflective coating has been described with particular reference to the coating of radiation dosimeter elements, it is to be understood that it is applicable with corresponding benefit to the coating of other reflective surfaces or reflector elements, such as photographic reflectors.

According to the provisions of the patent statutes, we have explained the principle and mode of practicing our invention and have described what we now consider to represent its best embodiment. However, we desire to have it understood that, within the scope of the appended claims, the invention may be practiced otherwise than as specifically described.

We claim:

1. A gamma radiation dosimeter characterized by high luminuous reflectance and good hiding power comprising a dosimeter element shape, a film of binder on the side portion and one end of said shape, and a coat of a white particle pigment on said binder, said binder having substantially the same index of refraction as said element and holding said pigment in place.

2. A dosimeter according to claim 1, said particle pigment being magnesia.

3. A gamma radiation color standard comprising a shape formed from synthetic resin, a film of said resin on the side portion and one end of said shape, and a coat of a white particle pigment on said binder, said binder having substantially the same index of refraction as said element and holding said pigment in place.

4. A standard according to claim 3, said resin being a glycol alkyd copolymer with styrene.

5. A standard according to claim 3, said particle pigment being selected from the group consisting of magnesia and titania.

References Cited in the file of this patent

UNITED STATES PATENTS

| | | |
|---|---|---|
| 1,150,118 | Hewitt | Aug. 17, 1915 |
| 2,024,562 | Berch | Dec. 17, 1935 |
| 2,512,769 | Crumrine | June 27, 1950 |
| 2,559,219 | Ludeman | July 3, 1951 |
| 2,662,033 | Andrew | Dec. 8, 1953 |
| 2,673,934 | Friedman | Mar. 30, 1954 |
| 2,680,816 | Stern | June 8, 1954 |
| 2,750,514 | Armistead | June 12, 1956 |
| 2,763,786 | Mauer et al. | Sept. 18, 1956 |

FOREIGN PATENTS

| | | |
|---|---|---|
| 17,666 | Great Britain | of 1903 |

OTHER REFERENCES

Modern Plastics, 1947, pp. 111 to 115.
Henley et al.: Nucleonics, December 1951, pp. 62 to 66.